(12) United States Patent
Meyer

(10) Patent No.: US 6,935,256 B1
(45) Date of Patent: Aug. 30, 2005

(54) AGITATION SYSTEM FOR AN AGRICULTURAL MACHINE PRODUCT DISTRIBUTION SYSTEM

(75) Inventor: Bradley John Meyer, Bismarck, ND (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/839,745

(22) Filed: May 5, 2004

(51) Int. Cl.[7] .............................. A01C 1/00; A01C 7/00

(52) U.S. Cl. ..................................... 111/174; 111/177

(58) Field of Search ..................... 111/174, 170, 177, 111/77, 925; 221/211

(56) References Cited

U.S. PATENT DOCUMENTS

| 6,047,652 A | 4/2000 | Prairie et al. |
| 6,609,468 B1 | 8/2003 | Meyer et al. |

*Primary Examiner*—Christopher J. Novosad
(74) *Attorney, Agent, or Firm*—The Law Office of Randall T. Erickson, P.C.

(57) ABSTRACT

A control system selectively operates an agitator within a main hopper or bulk tank for a product-on-demand delivery system. A differential pressure switch is used to control operation of the agitator. The differential pressure switch measures the pressure difference between the pressurized air pressure upstream of the tank and tank air pressure to determine when the system is not delivering adequate product to the application units, based on the high air flow rate in the system. When the sensor signals that the system is not delivering adequate product, the system automatically starts the agitator, and conversely when the sensor signals that the system is delivering adequate product, the system automatically stops the agitator.

25 Claims, 8 Drawing Sheets

AGITATION SYSTEM FOR AN AGRICULTURAL MACHINE PRODUCT DISTRIBUTION SYSTEM

FIELD OF THE INVENTION

The present invention is directed to an agitation system for an agricultural machine product distribution system. Particularly, the invention relates to a product-on-demand delivery system having a bulk tank for holding product, such as seed, and one or more nozzles for entraining the product in an air stream to feed one or more field application units, wherein the bulk tank includes an agitator therein to facilitate the entrainment of the product in the air stream.

BACKGROUND OF THE INVENTION

Pneumatic product-on-demand delivery systems have been used on agricultural seeding machines to automatically direct seed from a main seed hopper to a plurality of individual planting units. Each of the individual planting units has an auxiliary seed hopper for receiving the seed, a seed meter for metering the seed from the auxiliary seed hopper and a furrow opener for forming a planting furrow into which the metered seed is deposited. A fan is used to create pressurized air that forms an air stream on which the seed is taken to the planting units. These systems automatically replenish the auxiliary seed hoppers as needed.

One such system is described in U.S. Pat. No. 6,609,468, herein incorporated by reference. This product-on-demand delivery system comprises a frame having a main hopper and a plurality of application units. An air pump directs pressurized air to a manifold where the pressurized air is distributed to a plurality of air supply hoses. The air supply hoses are coupled to air inlets located on the bottom of the main hopper. Opposite the air inlets are corresponding product outlets for receiving the air streams and product entrained in the air streams. The product outlets are coupled to product supply hoses that are in turn coupled to auxiliary hoppers located on the application units. The bottom of the main hopper is concave and has outwardly diverging side walls. The air inlet is downwardly angled relative to the bottom and the product outlet is upwardly angled relative to the bottom.

Peaked baffles are located above corresponding air inlets and outlets so that product puddles form beneath the baffles. Gaps are formed between adjacent baffles so that product from the main hopper can flow into the product puddles.

The nozzle assembly is provided with an agitator assembly having a transverse rod that is provided with a plurality of radially extending fingers. The transverse rod is rotated back and forth by a gearbox/motor assembly. The radially extending fingers sweep the gaps between the individual baffles.

Planting systems have to handle many different types of seeds and many different treatments on the seed. Developing a single system that works well with all these different conditions without adjustment is difficult.

In the above-described seed-on-demand system, the agitator is configured to begin rotation when the planter is lowered to the ground and is unfolded. This is advantageous in order to ensure that seed is always delivered to the application units, even during the initial filling stage when the planter is not moving. However, the agitator, when used with easy flowing seed, will sometimes continue to push seed into the air stream which can eventually cause the system to plug the product hoses between the main hopper and the application units.

The present inventor has recognized that it would be desirable to provide a product-on-demand delivery system that has an increased reliability and a decreased requirement for operator control. The present inventor has recognized that it would be desirable to provide a product-on-demand delivery system that was effective to dispense a variety of seed types and conditions with a minimum of operator control and adjustment. The present inventor has recognized that it would be desirable to provide a product-on-demand delivery system that was effective to dispense a variety of seed types and seed conditions with a minimum of system plugging.

SUMMARY OF THE INVENTION

The invention provides a control for selectively operating an agitator within a main hopper or bulk tank for a product-on-demand delivery system. According to the preferred embodiment, a differential pressure switch is used to control operation of the agitator. The agitator system operates only under pre-selected conditions.

The differential pressure switch on the delivery system measures the difference between the pressurized air pressure into the tank and tank air pressure to electronically "sense" when the system is not delivering adequate product, based on the high air flow rate in the system. When the sensor signals that the system is not delivering adequate product, the system automatically starts the agitator. This situation can occur during initial filling or during planting sticky seeds or when filling at high rates. However, once the meters are full and the corresponding air flow rate is reduced, the differential pressure is reduced and the sensor signals the system to shut off the agitator, preventing the product hoses from being over fed and plugged.

According to the preferred embodiments of the invention, a product-on-demand delivery system for dispensing agricultural product onto a field from an agricultural machine includes a frame, a main hopper, at least one application unit, a product hose, an air pump, an agitator, a sensor, and a control system.

The main hopper is mounted on the frame. The main hopper has a nozzle assembly or other air entrainment device into which product in the main hopper is directed. The nozzle assembly comprises at least one air inlet and at least one product outlet. The application unit is mounted to the frame. The application unit is provided with a product meter for dispensing the product onto the field. The product hose is flow-coupled to the product outlet and to the product meter. The air pump is pneumatically coupled to the nozzle assembly. The air pump generates pressurized air directed into the nozzle assembly. Product located in the nozzle assembly is taken up by the air stream as the air stream passes through the nozzle assembly to the product outlet.

The agitator is located within the main hopper and is actuated to deliver product into the air stream. The sensor is arranged to respond to a magnitude of product flow rate through the product outlet. The control system is signal-connected to the sensor and to the agitator. The control system activates the agitator when the magnitude of product flow rate is determined to be below a pre-selected amount and deactivates the agitator when the magnitude of product flow rate is determined to be above a pre-selected amount.

The agitator can be driven by an electrical agitator drive or a mechanical drive controlled by an electric clutch, to mechanically move product within the main hopper. The sensor is pressure-connected to sense a differential pressure between the main hopper and an upstream side of the nozzle assembly downstream of the air pump. The control system comprises an electrical switch, responsive to the differential pressure sensed by the sensor. The control system is then responsive to the state of the switch to start or stop the agitator drive.

Alternately, the sensor comprises a differential pressure switch that is pressure-connected to sense a differential pressure between the main hopper and an upstream side of the nozzle assembly downstream of the air pump, and the control system comprises a relay responsive to the state of the switch to start or stop the agitator drive.

The differential pressure switch in conjunction with the agitator for the product-on-demand system can make the system more versatile and more automatic. The system also automatically shuts the agitator off when the fan is not running, making it easier to clean the tank. As product-on-demand systems are utilized for wider planters and new crops, a versatile system without the need for operator adjustments is advantageous.

Numerous other advantages and features of the present invention will be become readily apparent from the following detailed description of the invention and the embodiments thereof, from the claims and from the accompanying drawings.

DETAILED DESCRIPTION

Figure 1:
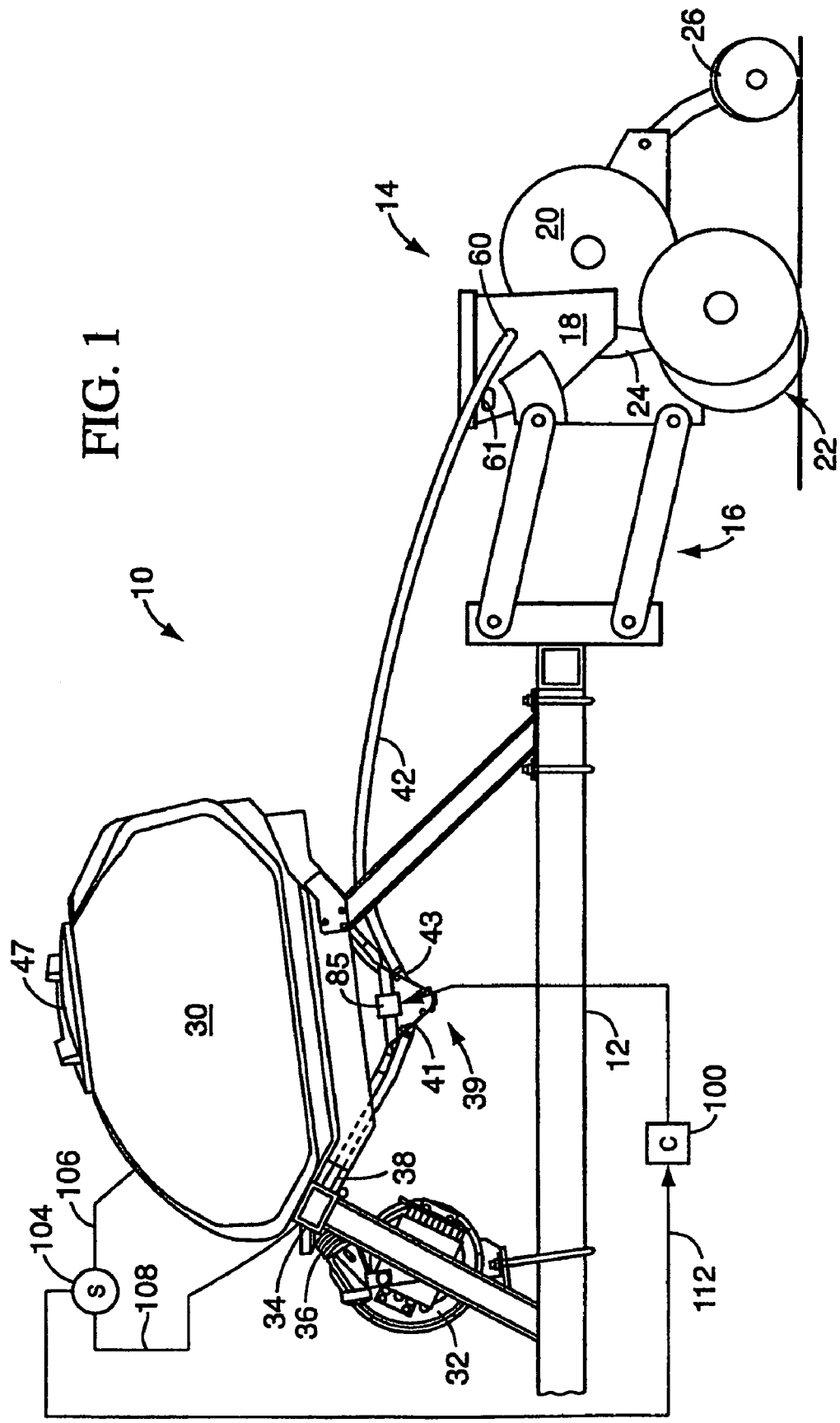
FIG. 1 is a schematic, side view of an agricultural planter using the subject product-on-demand delivery system.
Figure 2:
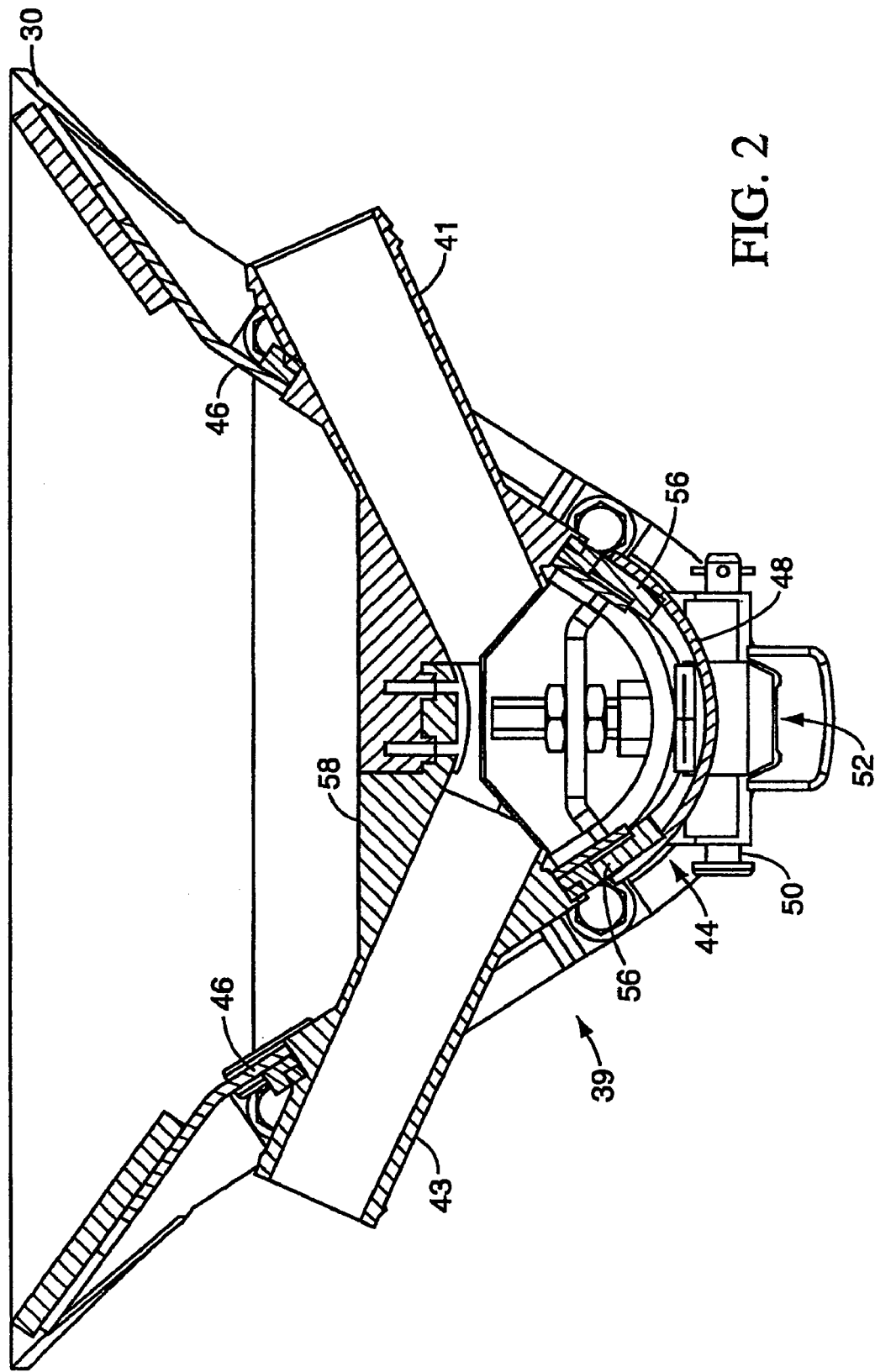
FIG. 2 is a side cross sectional view of the nozzle assembly of the product-on-demand delivery system.
Figure 3:
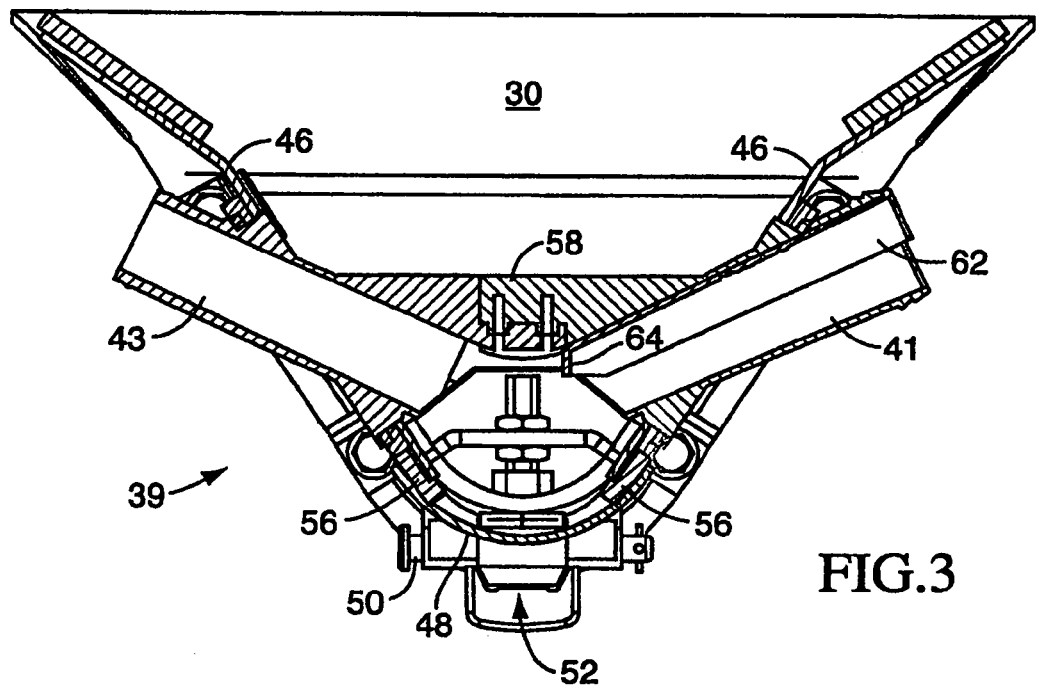
FIG. 3 is a side cross sectional view of the nozzle assembly of the product-on-demand delivery system having an air deflecting insert.
Figure 4:
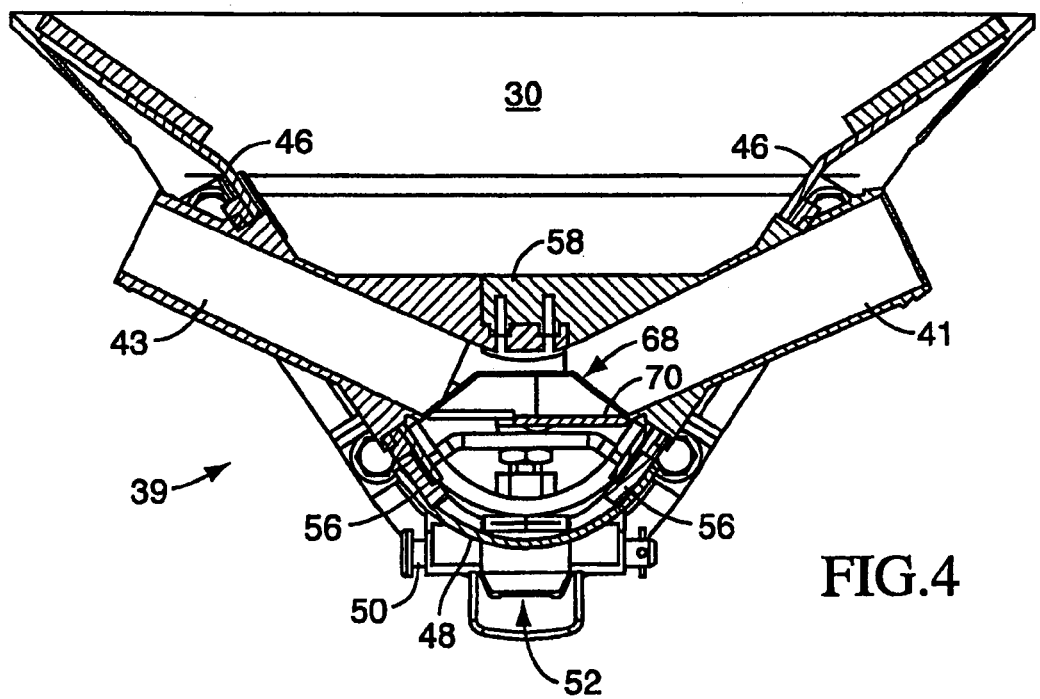
FIG. 4 is a side cross sectional view of the nozzle assembly of the product-on-demand delivery system having a product exposure limiting element.
Figure 5:
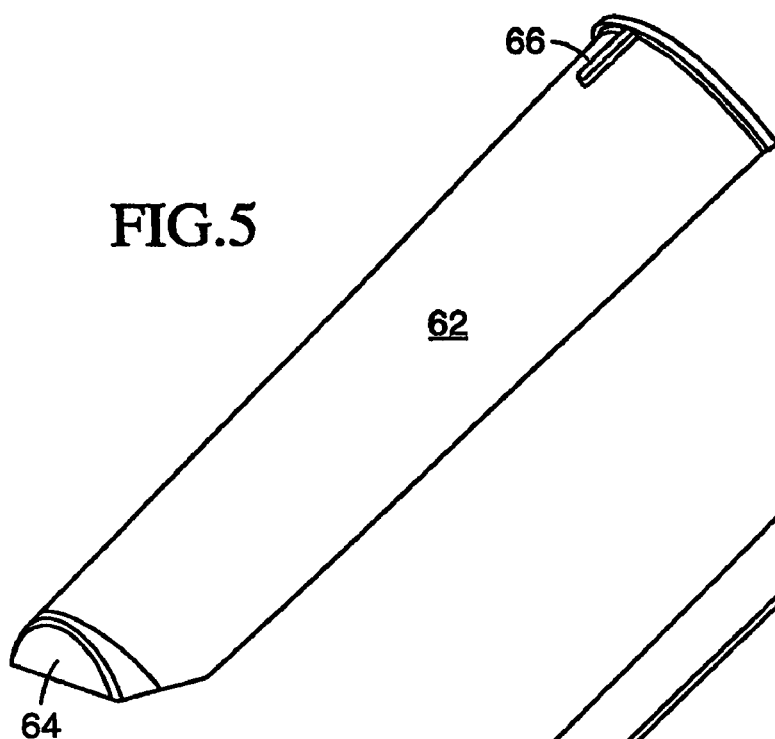
FIG. 5 is a top perspective view of the air deflecting insert.
Figure 6:
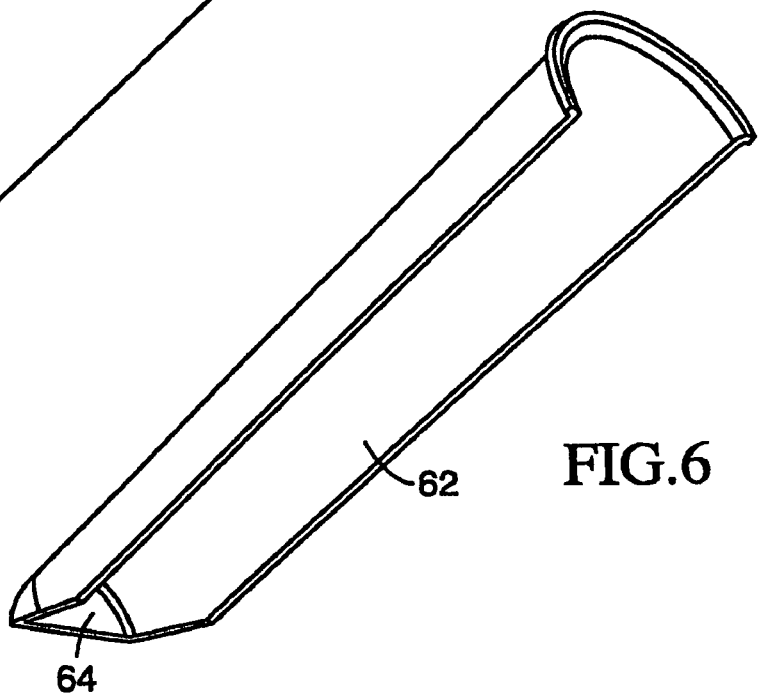
FIG. 6 is a bottom perspective view of the air deflecting insert.
Figure 7:
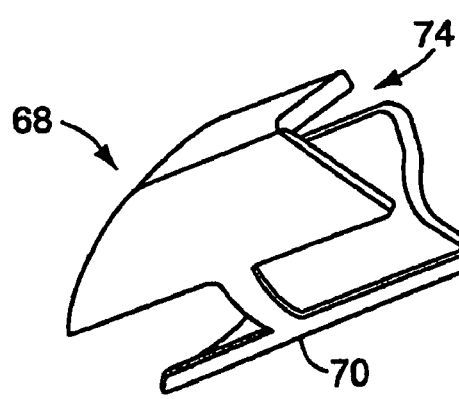
FIG. 7 is a bottom perspective view of the product exposure limiting element.
Figure 8:
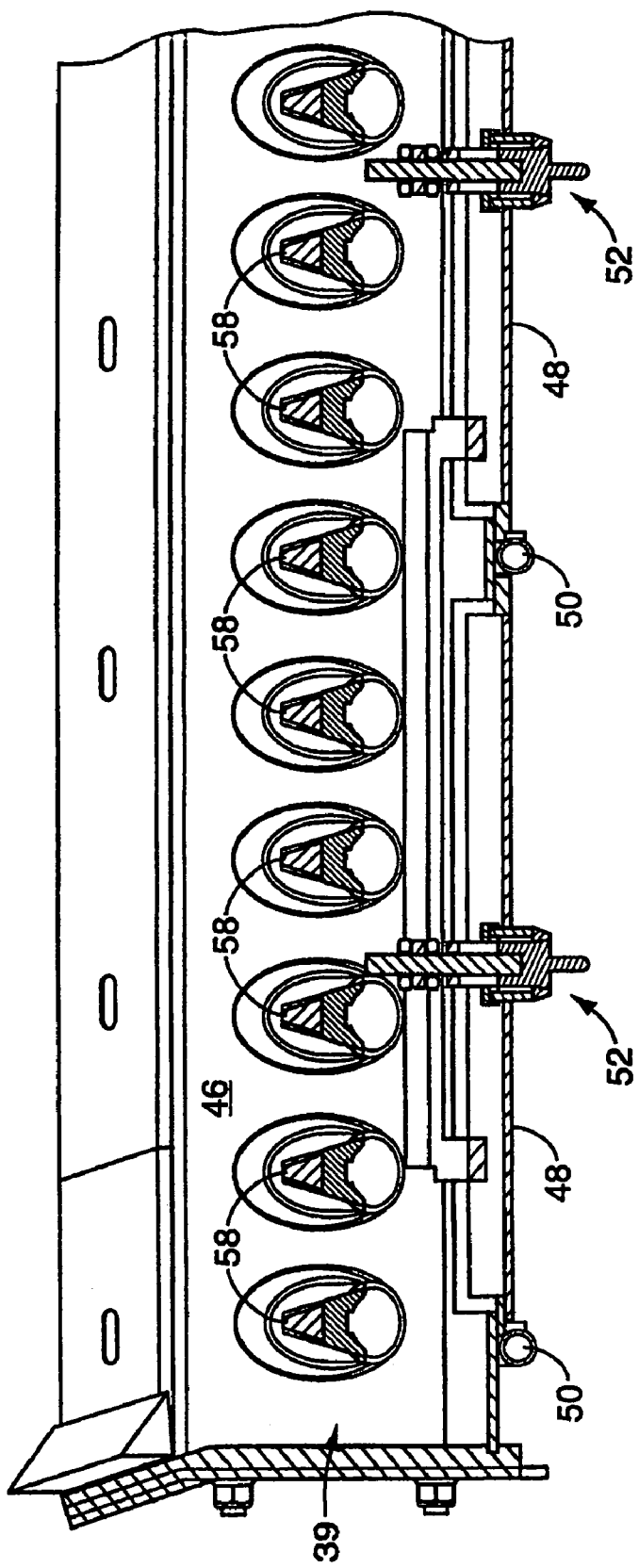
FIG. 8 is a front cross sectional view of the nozzle assembly of the product-on-demand delivery system.
Figure 9:
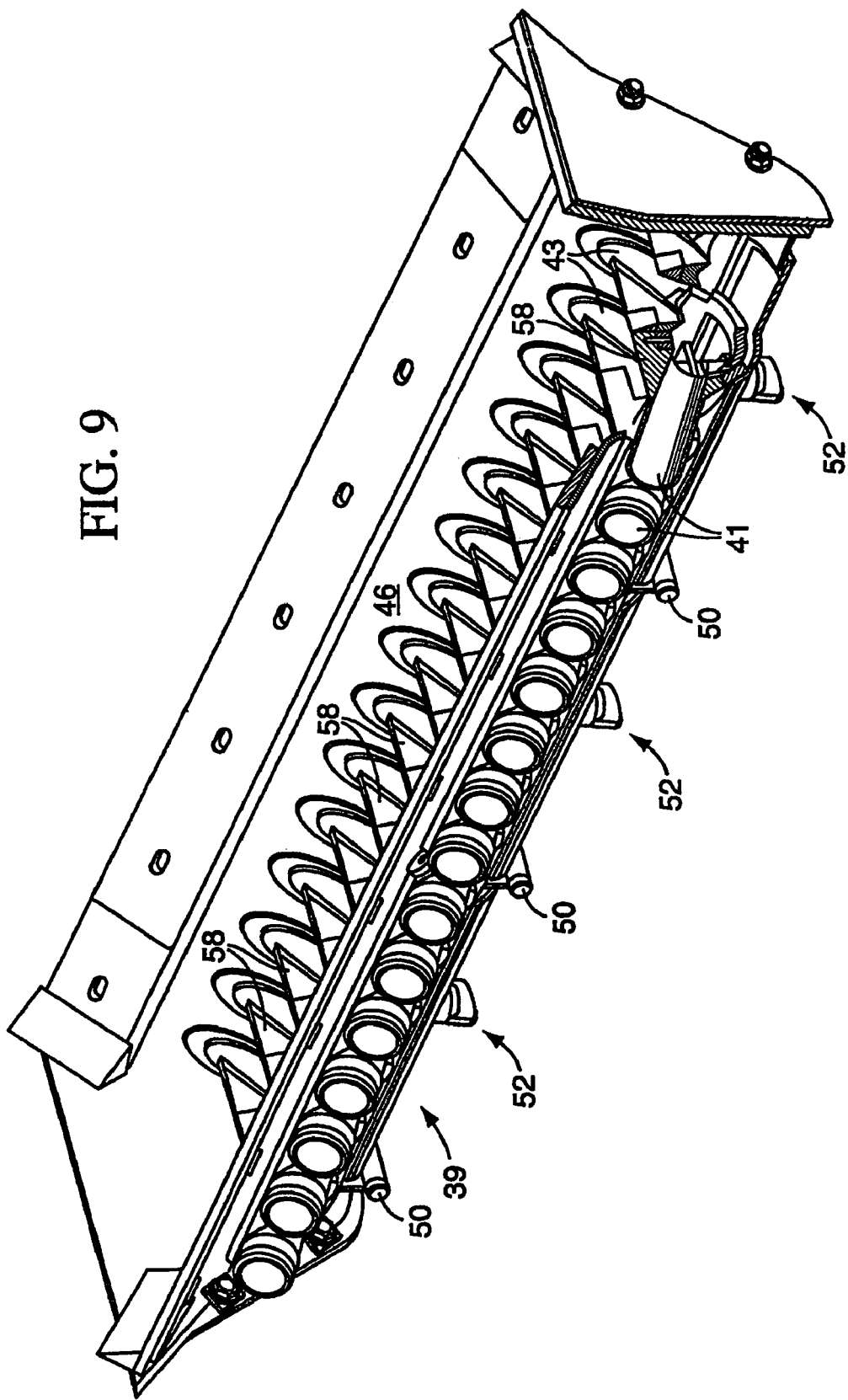
FIG. 9 is a front perspective and partial cross sectional view of the nozzle assembly of the product-on-demand delivery system.
Figure 10:
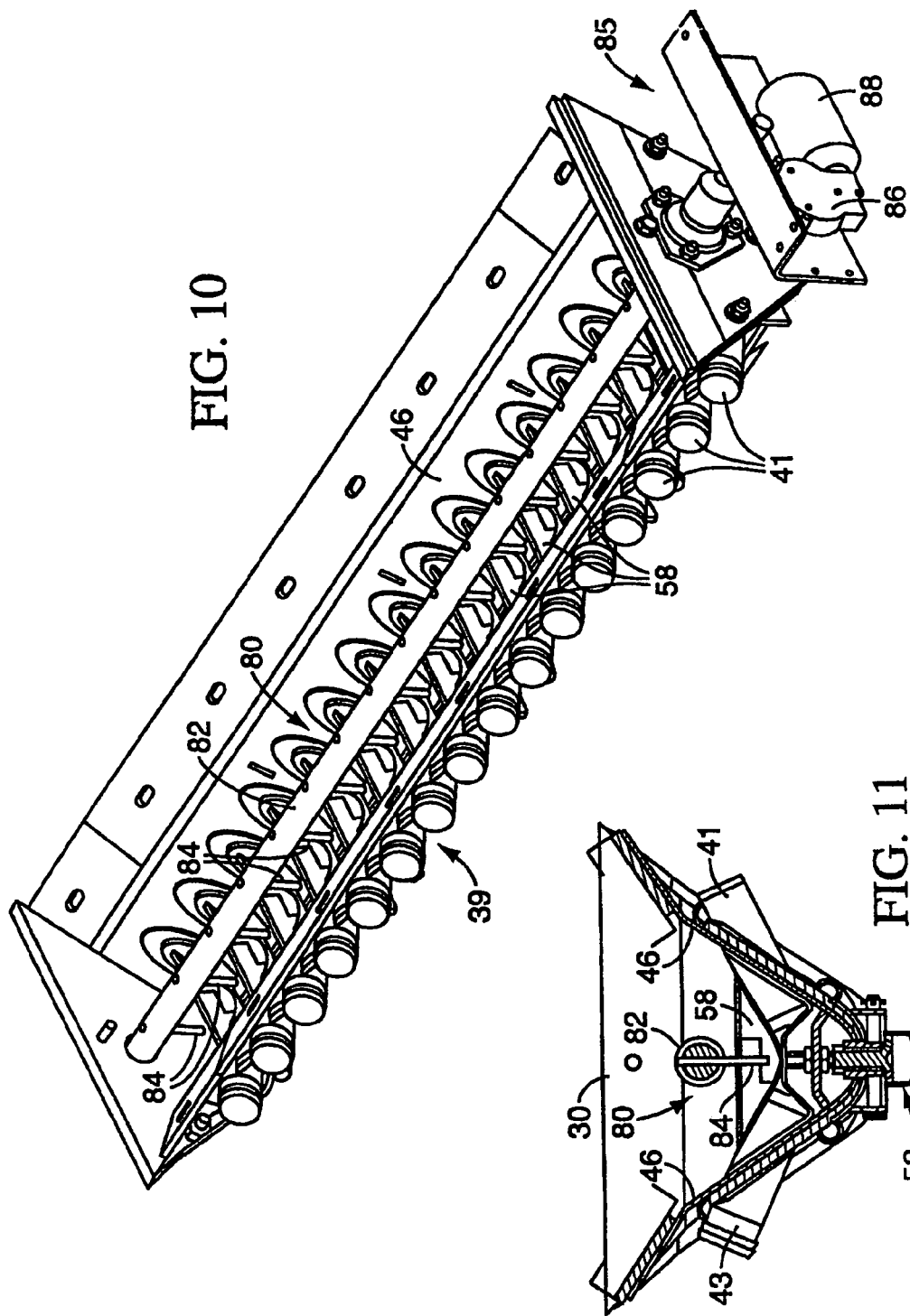
FIG. 10 is a front perspective view of the nozzle assembly being provided with an agitator assembly.
Figure 11:
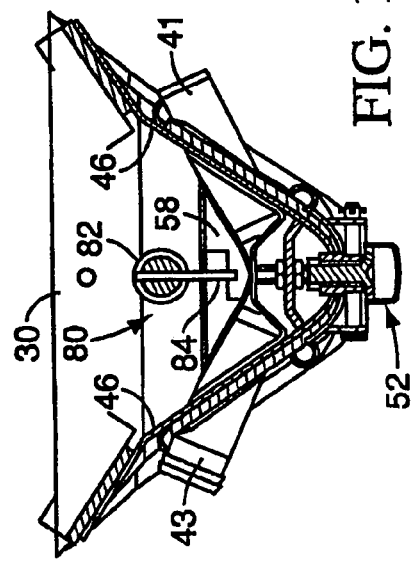
FIG. 11 is a cross sectional view of the nozzle assembly being provided with an agitator assembly.
Figure 12:
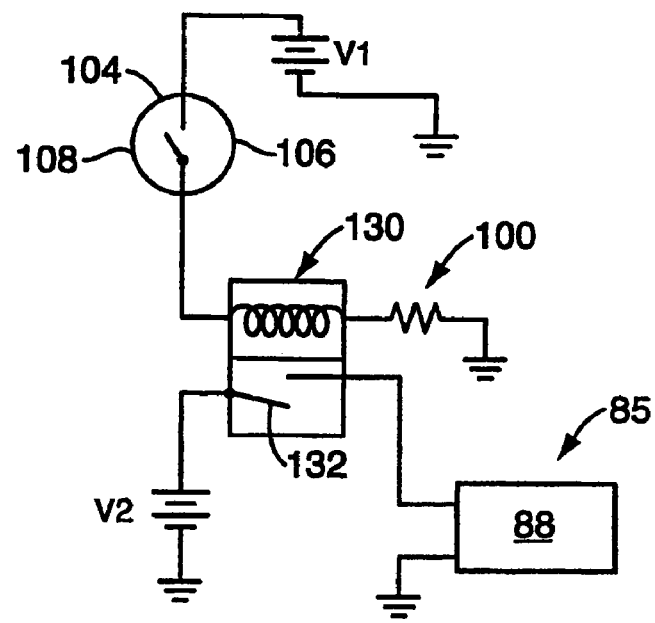
FIG. 12 is a schematic diagram of one control system of the invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

An agricultural seeding machine 10 comprises a frame 12 on which are mounted a plurality of individual planting units 14. The planting units 14 are coupled to the frame 12 by a parallelogram linkage 16 so that the individual planting units 14 can move up and down to a limited degree relative to the frame 12. Each of the individual planting units comprises an auxiliary seed hopper 18 for holding seed, a seed meter 20 for metering seed received from the auxiliary seed hopper 18 and a furrow opener 22 for forming a planting furrow in a field for receiving metered seed from the seed meter 20. The seed is transferred to the planting furrow from the seed meter by a seed tube 24. A closing assembly 26 is used to close the planting furrow with the seed contained therein. In the preferred embodiment the seed meter 20 is a vacuum seed meter, although other types of seed meters using mechanical assemblies or positive air pressure could also be used with the subject invention. It should be noted that the present invention could also be used to apply non-seed products to the field. For seed and non-seed products, the planting unit could be considered an application unit with an auxiliary hopper for holding product, a product meter for metering product received from the auxiliary hopper and an applicator for applying the metered product to a field. For example a dry chemical fertilizer or pesticide could be directed to the auxiliary hopper and metered by the product meter and applied to the field by the applicator.

The main frame 12 supports a main hopper or tank 30 and an air pump 32. The air pump 32 is driven by a hydraulic motor; however other motor arrangements could be used, like electric motors for driving the air pump 32. The air pump 32 directs pressurized air to a manifold 34 through main air hose 36. The manifold 34 is formed from a hollow closed tubular support of the main frame 12. The manifold 34 is provided with a plurality of manifold outlets corresponding to the number of planting units 14 mounted to the frame 12. Individual air supply lines 38 extend from the manifold outlets and direct pressurized air from the manifold 34 to the upstream side of the nozzle assembly 39. The nozzle assembly 39 is located at the bottom of the main hopper 30. Product located in the main hopper 30 flows by gravity to the nozzle assembly 39. The upstream side of the nozzle assembly 39 is provided with a number of air inlets 41 corresponding to the number of air supply hoses 38. The air inlets 41 are spaced transversely along the upstream side of the nozzle assembly 39. The downstream side of the nozzle assembly 39 is provided with a number of product outlets 43 corresponding to the number of air supply hoses 38. The product outlets 43 are also spaced transversely along the downstream side of the nozzle assembly 39. The product outlets 43 lie opposite from the air inlets 41. Each air inlet 41 is aligned with a respective product outlet 43. Product supply hoses 42 extend from the product outlets 43 to the individual auxiliary hoppers 18 for directing product entrained in the air stream to the auxiliary hoppers 18.

The nozzle assembly 39 is provided with a concave bottom 44 having outwardly diverging sidewalls 46. Product in the form of seed or non-seed product is placed in the main hopper 30 through a lid 48. Portions of the nozzle assembly 39 can be opened to form a cleanout door 48 as described in U.S. Pat. No. 6,609,468.

The air inlet 41 is angled downwardly relative to the concave bottom 44 and correspondingly the product outlet 43 is angled upwardly relative to the concave bottom 44. An integral baffle 58 extends between the air inlet 41 and the product outlet 43. The baffle 58 is peaked and is located above the air stream passing from the air inlet 41 to the product outlet 43. The downwardly angled air inlet 41 prevents product from backing up into the air supply hose 38, whereas the upwardly angled product outlet 43 prevents product from flowing into and clogging the product supply hose 42.

Figure 13:
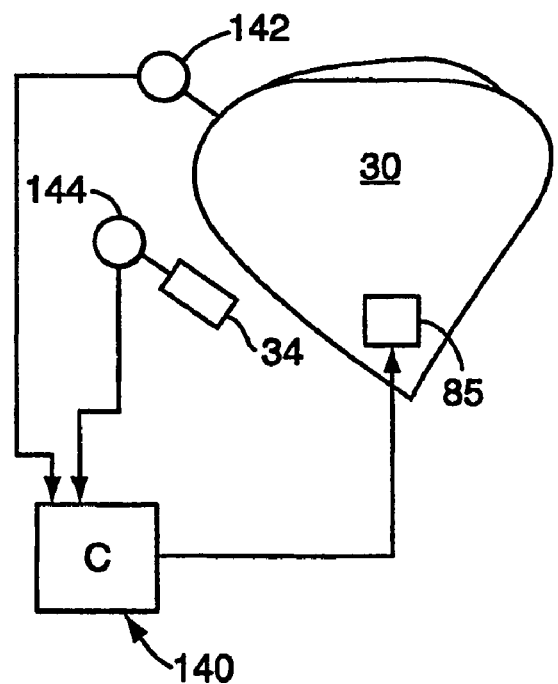
FIG. 13 is a schematic diagram of an alternate control system of the invention.

Adjacent air inlet 41 and product outlet 43 combinations are transversely spaced from one another so that seed or non-seed product can pass on either side of the baffles 58 and puddle beneath the baffles 58. An air stream passing from the air inlet 41 to the product outlet 43 picks up product located in the puddle and directs it through product supply hose 42 to the auxiliary hopper 18. The transfer of product from the main hopper 30 to the auxiliary hoppers 18 is done automatically as product is needed by the auxiliary hopper 18. As an individual auxiliary hopper 18 fills up with product, the auxiliary hopper product inlet 60 becomes covered by product blocking and slowing the air stream so that the air stream no longer picks up product in the main hopper 30 and transports the product to the auxiliary hopper 18. Conversely, as product is used up by the product meter 20, the auxiliary hopper product inlet 60 is uncovered and the air stream again picks up product for delivery to the auxiliary hopper 18. In this way the auxiliary hoppers 18 are always and automatically provided with product. The side walls of the auxiliary hoppers 18 are provided with screen vents 61 for venting air pressure in the auxiliary hoppers 18. The vent screens 61 can also be located in the lids of the auxiliary hoppers 18 as long as the vent screens 61 are above the respective product inlets.

In some situations product having large particles, like large seeds (corn and soybeans), are difficult for the air stream to pick up. To accommodate large seed, the air inlet 41 may be provided with an insert 62 having an air stream deflecting portion 64 that deflects a portion of the air stream downwardly to agitate the seed in the seed puddle and capture the seed in the air stream passing into the product outlet 43. The insert is provided with a locating tang 66 that engages a slot formed in the air inlet 41 to correctly orient the insert 62 and the air deflecting portion 64.

In other situations the seed or non-seed product may be too light and will be readily carried by even a small air stream. To overcome this problem the baffles 58 may be provided with an element 68. The element 68 can be clipped on to the baffles 58. The element has an obstructing bottom 70 that limits the amount of product exposed to the air stream. Element 68 can be made of plastic. The upper gap 74 is opened so that the clip can be clipped to the baffle 58.

According to a preferred embodiment, the large seed insert 62 can be eliminated in favor of an agitator assembly 80. The agitator assembly 80 comprises a transverse rod 82 extending across the nozzle assembly 39. The transverse rod 82 is provided with a plurality of radially extending fingers 84. As shown, in FIG. 10 the fingers are transversely aligned with one another.

The transverse rod 82 is rotated back and forth by an agitator drive 85 comprising a gearbox 86 being driven by a motor 88. Alternately, the motor 88 can be replaced by an electric clutch that selectively transfers rotary power to the gearbox from a mechanical drive. The mechanical drive can be, for example, a drivetrain that receives rotary power from a wheel of the frame that carries the hopper.

At the bottom dead center position of the fingers 84 they extend between the individual nozzles defined by the aligned air inlets 41 and the product outlets 43. In this way the fingers 84 sweep the area between the nozzles. The gear box/motor assembly 86/88 drive the transverse rod fifty-one and one-half degrees in each direction from the bottom dead center illustrated in FIG. 11. As such, the fingers 84 sweep an arc of one-hundred three degrees.

Hard flowing seed requires more air flow to entrain the seed into the nozzle outlet, and, once the meter elbow at the auxiliary hopper 14 is exposed because adequate seed was not picked up at the tank, a large amount of airflow is present. During this situation, there is a large difference in pressure between the air in the manifold 34 and the tank or hopper 30.

A large pressure drop (approx 2" $H2O$) occurs as air flows from the manifold down through the manifold outlet, supply hose, and nozzle inlet. Also, there is a reduced flow restriction for the supply air finds it easier to go out the nozzle outlet and to the now nearly empty auxiliary hopper.

Alternately, small seeds that are picked up by low air flows quickly can continually keep the auxiliary hopper full. During planting and especially at end stops, the agitator tends to continually push these small seeds into the air stream under the baffle where they are carried into the nozzle outlet. Over time, the hose can become full as more product is picked up than is metered out at the auxiliary hopper. In this situation, there is very little airflow and hence a very small difference in pressure between component locations in the system.

As shown in FIG. 1 the agitator drive 85 is signal connected to a control 100. The control 100 is operable to turn on or off the agitator drive 85, particularly by activating or deactivating the motor 88 (FIG. 10), or alternately, by activating or deactivating an electric clutch (not shown) that communicates rotary power to the agitator system.

A differential pressure switch 104 is carried on the frame 12. The switch 104 is pneumatically connected by a tube 106 to the tank 30 and by a tube 108 to the manifold 34. The switch 104 is responsive to the differential pressure between the tank 30 and the manifold 34 to change switch states (open to closed, or vice versa) at a pre-selected differential pressure and to electrically indicate the switch state to the control 100 via a signal line 112 that is signal connected to the control 100.

At a high differential pressure the switch 104 has a corresponding switch state that sends a signal through the line 112 to the control 100. The control 100 turns on the agitator drive 85. At a low differential pressure the switch 104 has a corresponding switch state that sends a corresponding signal 112 to the control 100 to shut off the agitator drive 85.

Although the pressure taps for the differential pressure switch 104 as are described above are taken at the manifold 34 and the tank 30, the taps could be between other points that are separated by a distance, or by a pressure drop, along the air path between the air pump 32 and the application units 14, such that increased or decreased air flow can be sensed.

The control 100 can be part of an overall machine controller.

As illustrated in FIG. 12, the control 100 can be comprised of a relay switch 130 that is charged by a control voltage V1 through the differential pressure switch 104. A motor driving voltage V2 is connected to the switch element 132 of the relay switch 130 as is the positive lead of the agitator motor 88, or alternately, an electric clutch. When the differential pressure switch 104 changes states, the voltage V1 causes the relay to switch states to either energize the motor 88, or alternately, an electric clutch, with the voltage V2 or de-energize the agitator motor 88, or alternately, an electric clutch.

FIG. 13 illustrates an alternate embodiment wherein a control 140 receives pressure signals from pressure sensors 142, 144 from the tank 30 and the manifold 34 respectively, and then, possibly considering other operating parameters from other sensors, starts or stops the agitator drive 85. In this example the differential pressure sensor incorporates part of the control to compare the signals from the pressure sensors 142, 144.

The control 140 can be part of an overall machine controller.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A product-on-demand delivery system for agricultural product, said system comprising:
    a frame;
    a main hopper mounted on the frame, the main hopper having a nozzle assembly into which product in the main hopper is directed, said nozzle assembly comprising at least one air inlet and at least one product outlet;
    an application unit, said application unit provided with a product meter for dispensing the product onto a field;
    a product hose flow-coupled to said product outlet and to said product meter;
    an air pump pneumatically coupled to the nozzle assembly, the air pump generating pressurized air directed into the nozzle assembly;
    wherein product located in the nozzle assembly is taken up by the air stream as the air stream passes through the nozzle assembly to the product outlet;
    an agitator located within the main hopper and actuated to deliver product into the air stream;
    a sensor, arranged to respond to a magnitude of product flow rate through said product outlet;
    a control system that is signal-connected to the sensor and to the agitator, said control system activating the agitator when the magnitude of product flow rate is determined to be below a pre-selected amount.

2. The product-on-demand delivery system according to claim 1, wherein said agitator is driven by an agitator drive to mechanically move product within the main hopper, and said sensor is pressure-connected to sense a differential pressure between said main hopper and an upstream side of said nozzle assembly downstream of said air pump, and said control system comprises an electrical switch, responsive to the differential pressure sensed by said sensor, and said control system responsive to the state of the switch to start or stop said agitator drive.

3. The product-on-demand delivery system according to claim 1, wherein said agitator is driven by an agitator drive to mechanically move product within the main hopper, and said sensor comprises a differential pressure switch that is pressure-connected to sense a differential pressure between said main hopper and an upstream side of said nozzle assembly downstream of said air pump, and said control system comprises a relay responsive to the state of the switch to start or stop said agitator drive.

4. The product-on-demand delivery system according to claim 1, wherein said delivery system comprises a plurality of application units, wherein at least one air inlet comprises a plurality of air inlets and wherein said at least one product outlet comprises a plurality of product outlets, and a plurality of baffles, the baffles extend between and above the air inlets and the respective product outlets wherein gaps are formed between adjacent baffles, and wherein the agitator assembly is provided with a plurality of fingers that extend into the gaps formed between adjacent baffles.

5. The product-on-demand delivery system according to claim 4, wherein the agitator comprises a transverse rod that is located above the baffles, the transverse rod having the plurality of fingers extending radially outward from the transversely extending rod.

6. The product-on-demand delivery system according to claim 5, wherein the fingers are transversely aligned on the transversely extending rod.

7. The product-on-demand delivery system according to claim 6, wherein the transversely extending rod is rotated back and forth so that the fingers agitate the product located in the nozzle assembly.

8. The product-on-demand delivery system according to claim 1, wherein said nozzle assembly comprises an upstream sidewall, a downstream sidewall and a bottom, wherein said at least one air inlet comprises a plurality of air inlets coupled to said upstream sidewall and to said air pump, wherein said at least one product outlet comprises a plurality of product outlets, each aligned with an air inlet and coupled to the downstream sidewall, and a plurality of baffles each of which is arranged between an inlet and an outlet spaced from said bottom wherein said agitator comprises spaced apart portions that are movable between said baffles.

9. The product-on-demand delivery system according to claim 1, wherein each application unit comprises an auxiliary hopper flow connected between one of said outlets and a respective product meter.

10. A delivery system for dispensing seed, said system comprising:
    an implement frame that can be transported through a field;
    a main seed hopper mounted on the frame, the main seed hopper having at least one air entrainment device into which seed in the main seed hopper is directed by gravity and at least one seed outlet receiving air and seed from said at least one air entrainment device;
    a plurality of planting units, each planting unit is provided with a seed meter for metering seed and a furrow opener for forming a planting furrow into which metered seed is deposited, each seed meter is flow-coupled to at least one seed outlet of the main seed hopper;
    an air pump pneumatically coupled to the air-entrainment device so that seed located in the bottom of the main seed hopper is taken up by the air-entrainment device and is directed to the planting units via said at least one seed outlet;
    an agitator located within the main seed hopper and actuated to deliver product into the air-entrainment device;
    a sensor, arranged to respond to a magnitude of seed flow rate through said seed outlet;
    a control system that is signal-connected to the sensor and to the agitator, said control system activating the agitator when said magnitude of seed flow rate is determined to be below a pre-selected amount.

11. The product-on-demand delivery system according to claim 10, wherein said agitator is driven by an agitator drive to mechanically move seed within the main seed hopper, and said sensor is pressure-connected to sense a differential pressure between said main seed hopper and an upstream side of said air-entrainment device downstream of said air pump, and said control system comprises an electrical switch, responsive to the differential pressure sensed by said sensor, and said control system responsive to the state of the switch to start or stop said agitator drive.

12. The product-on-demand delivery system according to claim 10, wherein said agitator is driven by an agitator drive to mechanically move seed within the main seed hopper, and said sensor comprises a differential pressure switch that is pressure-connected to sense a differential pressure between said main seed hopper and an upstream side of said air-entrainment device downstream of said air pump, and said control system comprises a relay responsive to the state of the switch to start or stop said agitator drive.

13. The product-on-demand delivery system according to claim 10, wherein each planting unit is provided with an auxiliary seed hopper located between the seed outlet and the respective seed meter.

14. The product-on-demand delivery system according to claim 13, compromising an air supply hose, and a seed supply hose coupled to the seed outlet, wherein said air-entrainment device comprises a nozzle assembly into which seed in the main seed hopper is directed, the nozzle assembly having an upstream sidewall, a downstream sidewall, a bottom and said at least one seed outlet;

the air pump generates an air stream that is directed into the air supply hose, the air supply hose has an air inlet that is coupled to the upstream sidewall of the nozzle assembly opposite the seed outlet, so that the air stream passes from the air inlet of the air supply hose through the nozzle assembly to the seed outlet through the nozzle assembly, wherein product located in the nozzle assembly is taken up by the air stream as the air stream passes through the nozzle assembly to the at least one seed outlet.

15. A product-on-demand delivery system according to claim 14, wherein the nozzle assembly is provided with a plurality of baffles corresponding to the number of planting units, the baffles extend between and above the air inlets of the air supply hoses and the respective seed outlets so that the air streams from the air supply hoses pass beneath the baffles, and gaps are formed between adjacent baffles; and wherein said agitator comprises portions that are repeatedly moved within said gaps.

16. The product-on-demand delivery system according to claim 15, wherein the agitator comprises a transverse rod that is located above the baffles, said portions comprise a plurality of fingers extending radially outward from the transverse.

17. The product-on-demand delivery system according to claim 16, wherein the fingers are transversely aligned on the transversely extending rod.

18. The product-on-demand delivery system according to claim 17, wherein the transverse rod is rotated back and forth so that the fingers agitate the product located in the nozzle assembly.

19. A product-on-demand delivery system according to claim 18, wherein the transverse rod is rotated back and forth through an arc.

20. A product-on-demand delivery system according to claim 19, wherein the middle of the arc is at a bottom dead center position in the nozzle assembly.

21. An agitation system for a product application unit, comprising:
a tank for holding product;
a source of pressurized air;
an air nozzle having an air inlet in flow communication with said source of pressurized air, a product inlet, and an air and product outlet, said product inlet in flow communication with said product within said tank;
a product delivery path in flow communication with said air and product outlet;
an agitator within said tank and configured to agitate product within said tank to deliver product into said product inlet to be entrained by air flowing between said air inlet and said air and product outlet;
a sensor configured to issue a signal corresponding to the difference between product demand and product flow rate from said air and product outlet; and
a control signal-connected to said sensor and to said agitator, and configured to activate said agitator when product demand is greater than product flow rate, and to deactivate said agitator when product demand is less than product flow rate.

22. The system according to claim 21, wherein said agitator comprises an element that is moved through the product within said tank to mechanically agitate the product.

23. The system according to claim 22, wherein said agitator comprises a shaft that is rotated about an axis thereof, and said element extends radially from said shaft.

24. The system according to claim 21, wherein said sensor senses pressure drop of air flowing through a portion of a flow path between said source of pressurized air and said product delivery path.

25. The system according to claim 21, wherein said sensor senses pressure drop between said source of pressurized air and said tank.

* * * * *